United States Patent [19]
Noguchi et al.

[11] 3,980,060
[45] Sept. 14, 1976

[54] INTERNAL COMBUSTION ENGINE

[75] Inventors: Masaaki Noguchi, Nagoya; Yukiyasu Tanaka, Okazaki; Setsuro Sekiya; Katsuhiko Motosugi, both of Toyota, all of Japan

[73] Assignee: Toyota Jidosha Kogyo Kabushiki Kaisha, Japan

[22] Filed: July 3, 1974

[21] Appl. No.: 485,531

[30] Foreign Application Priority Data
July 12, 1973   Japan............................. 48-078817

[52] U.S. Cl........................... 123/32 ST; 123/75 B; 123/127
[51] Int. Cl.² ........................................ F02B 3/00
[58] Field of Search............ 123/32 ST, 32 SP, 127, 123/DIG. 4, 75 B, 32 C, 32 F, 32 G, 32 K, 32 L

[56] References Cited
UNITED STATES PATENTS

| | | |
|---|---|---|
| 3,092,088 | 6/1963 | Goossak............... 123/32 ST |
| 3,364,911 | 1/1968 | Baudry.................. 123/127 |
| 3,830,205 | 8/1974 | Date................. 123/32 ST |
| 3,832,984 | 9/1974 | Taguchi............. 123/75 B |

Primary Examiner—Charles J. Myhre
Assistant Examiner—Daniel J. O'Connor
Attorney, Agent, or Firm—Oblon, Fisher, Spivak, McClelland & Maier

[57] ABSTRACT

An internal combustion engine with improved distribution of rich mixture, wherein two suction lines are provided, i.e., a main line which introduces the lean mixture into the cylinder and an auxiliary line which introduces the rich mixture; the auxiliary line opens near the valve seat at the end of the main line and the opening end of the auxiliary line is opened or closed by one part of the intake valve.

14 Claims, 6 Drawing Figures

INTERNAL COMBUSTION ENGINE

BACKGROUND OF THE INVENTION

1. Field of the Invention:

The present invention relates generally to an internal combustion engine and more particularly to an internal combustion engine having an improved burning mechanism for the air-fuel mixture for reduction of harmful auto emissions.

2. Description of the Prior Art:

In order to obtain better combustion and better control of exhaust from the internal combustion engine, the vitally important conditions are that the air/fuel ratio which influences combustion be maintained at a proper value and the supply of mixture to the cylinder be kept even.

Means for separating the mixture into a rich one and a lean one, supplying the rich and lean mixtures to the cylinder and assuring perfect burning of the lean mixture by ignition of the rich mixture, thereby reducing harmful emissions in the exhaust gas have been developed. There are two typical modes of such means:

1. In a type, in which an auxiliary combustion chamber is installed separately from the main combustion chamber; a mixture suction valve is provided in the auxiliary combustion chamber; the rich mixture is introduced into the auxiliary combustion chamber and the lean mixture into the main combustion chamber; spark ignition of the rich mixture takes place in the auxiliary combustion chanber first; and through the flame of the rich mixture, combustion of the lean mixture subsequently takes place in the main combustion chamber.

2. In the other mode, in which a rich mixture supply passage is installed within the main passage leading to the main combustion chamber of the cylinder, or along this main passage; the rich mixture supply passage opens just short of the intake valve; and the rich mixture can thereby be supplied close to the spark plug in the main combustion chamber.

In the first described mode, an additional valve has to be installed in the auxiliary combustion chamber. Moreover, a valve-operating mechanism for the valve has to be added, which renders the construction extremely complicated. The latter mode, though the construction is simplified, is hard to realize, because control of the rich mixture distribution becomes poor as a result of pressure pulsations in the suction lines under the effect of other cylinders in the multi-cylinder engine.

SUMMARY OF THE INVENTION

The present invention, belonging to the second method mentioned above, aims at elimination of its drawbacks. Accordingly, one object of the present invention is to provide an internal combustion engine wherein maintenance of proper air/fuel ratio of mixture and uniformity of mixture supply can be assured by a very simple system when the separated portions, lean and rich, of the sucked mixture are fed to the cylinders.

Another object of the present invention is to provide an internal combustion engine wherein for the purpose of sucking the mixture into the cylinders, a main line of suction for the lean mixture of mixture and an auxiliary line of suction for the rich portion are installed; the auxiliary line being located near the valve seat at the end of the main line; and the opening end of the auxiliary line opens in one part of the intake valve.

Briefly, in accordance with one embodiment of the present invention, these and other objects are obtained by providing an internal combustion engine having a combustion chamber, a main passage following the main combustion chamber for introducing the lean mixture, a cylinder head equipped with an intake valve for controlling the main passage, a valve seat for seating the intake valve, an auxiliary combustion chamber located near the valve seat, an auxiliary passage for the rich mixture provided within the cylinder head separately from the main passage, and a spurt duct to open the auxiliary passage at or adjacent to the valve seat, whereby the spurt hole in the auxiliary passage can be interlocked in action with the intake valve.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figures 4, 5:
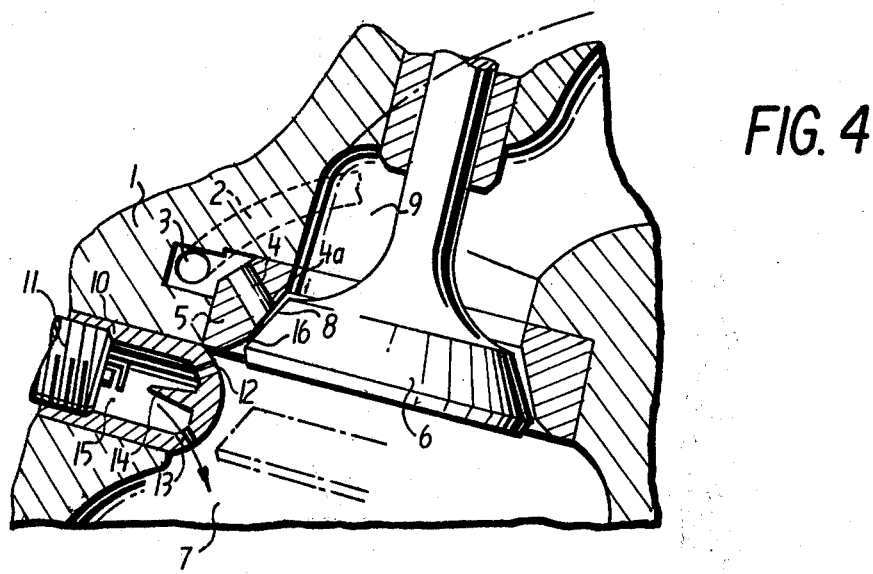
FIG. 4 is a partial sectional view of the cylinder head in one embodiment of the present invention.
FIG. 5 is a sectional view of the cylinder head in another embodiment of the present invention.

Referring now to the drawings wherein like reference characters designate identical or corresponding parts throughout the several views, and more particularly to FIG. 4, wherein a valve seat 5 is provided at the open edge of the main passage 9 in the cylinder head 1 in which the main combustion chamber 7 and the main passage 9 for introducing the lean mixture into the main combustion chamber 7 are installed. An intake valve 6, interlocking with a cam shaft (not shown), is seated in the valve seat 5. Within the main combustion chamber 7 is installed, near the valve seat 5, an auxiliary combustion chamber 10. The auxiliary combustion chamber 10 consists of the spark plug 11, the space 15 in front of the spark plug, the orifice 12 through which the mixture is introduced into the space 15, the orifice 13 through which a flame jet spurts from the space 15 into the main combustion chamber 7, and the partition wall separating the two orifices 12 and 13.

Within the cylinder head 1 there is formed an auxiliary passage 2 for supply of the rich mixture, in addition to the main passage 9. The auxiliary passage 2 communicates with the path 3 formed at the periphery of the valve seat 5. At a position nearest to the orifice 12 in the auxiliary combustion chamber 10, a spurt hole 4 for the rich mixture is formed and penetrates the valve seat 5 to open into the main passage 9. The open end 4a of the spurt hole 4 is practically closed when the intake valve 6 sits on the valve seat 5.

In this embodiment, the intake valve 6, during the suction stroke of the cylinder, detaches itself from the valve seat 5 and opens into the main combustion chamber 7, whereby the lean mixture in the main passage 9 is sucked into the main combustion chamber 7 from around the valve 6. At the same time, the rich mixture flowing into the auxiliary passage 2 goes through the open spurt hole 4 into the main combustion chamber 7, a part thereof going into the auxiliary combustion chamber 10.

Meanwhile, the part of the rich mixture which has flowed to the vicinity of the auxiliary combustion chamber 10 in the compression stroke is forced through the orifices 12, 13 into the space 15, where the mixture is ignited by the spark plug 11. The flame generated spurts in a flame jet into the main combustion chamber 7 through the orifices 12, 13, such that the flame jet burns the mixture. When in the suction stroke, the intake valve 6 opens, and the part of the rich mixture from the spurt hole 4 is sucked into the auxiliary combustion chamber 10 under the effect of a negative pressure acting at the open edge of the spurt hole 4. The magnitude of the negative pressure depends on the gap created between the valve seat 5 and the intake valve 6. Since the gap 16 is somewhat narrower than the main passage 9, the flow velocity in the gap 16 is higher than the velocity of flow through the main passage 9.

Figure 1:
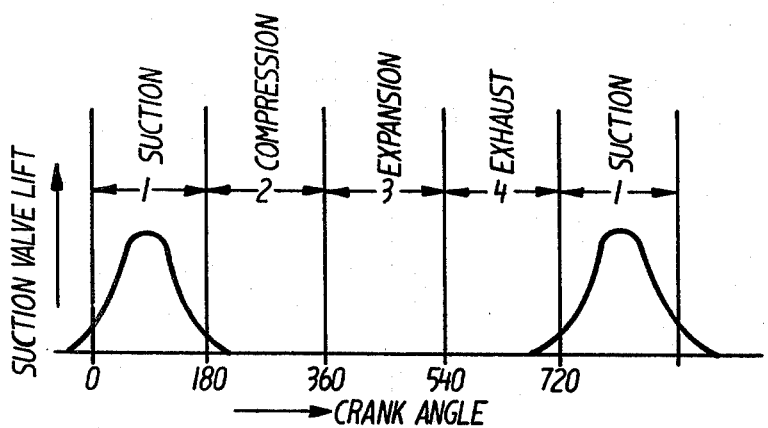
FIG. 1 is a diagram of suction valve lift characteristics.
Figure 2:
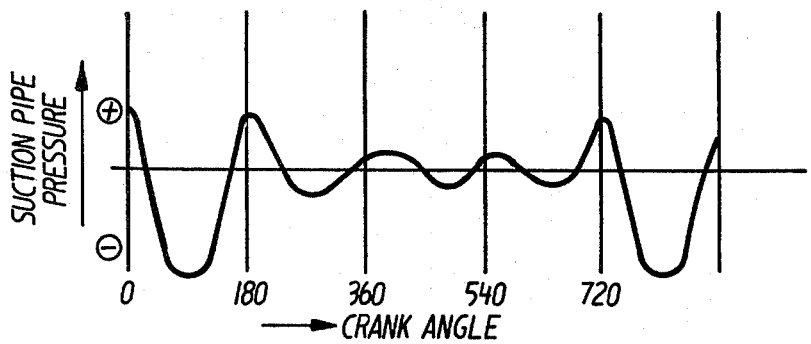
FIG. 2 is a diagram of negative pressure characteristics of the main line.

The characteristics of the suction line for the rich mixture under the opening and closing action of the intake valve 6 is illustrated for the case of four cylinders in FIGS. 1 to 3.

The relationship between the lift of intake valve 6 and the crank angle in the cylinder strokes of suction, compression, expansion and exhaust is shown in FIG. 1 and the associated negative pressure of suction in the main passage 9 is illustrated by a curve in FIG. 2. In the strokes of compression, expansion and exhaust, a positive-negative pressure region is created by compounding of pulsating waves generated in the suction stroke of the multi-cylinders. A difference in the characteristics of the positive-negative pressure between different cylinders so affects the mixture supplied to the cylinders that the distribution of the rich mixture becomes poor.

Figure 3A:
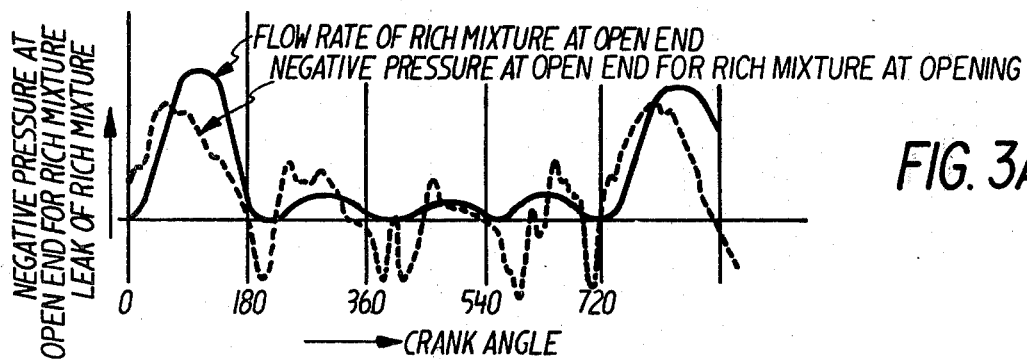
FIG. 3A shows rich mixture flow vs. negative pressure of rich mixture at an open end in the conventional four cylinder engine.

As indicated by a broken line in FIG. 3A, the flow path pressure of the rich mixture changes in the passage dramatically between positive and negative when the passage of the rich mixture is always held open through all the strokes (that is, the spurt hole 4 in the embodiment). Consequently, in pulsating wave spreads to all cylinders such that the rich mixture comes to flow out in all strokes of compression, expansion and exhaustion as indicated by a solid line in FIG. 3A. On account of a difference in the flow rate between the cylinders, the distribution of the mixture becomes poor.

Figure 3B:
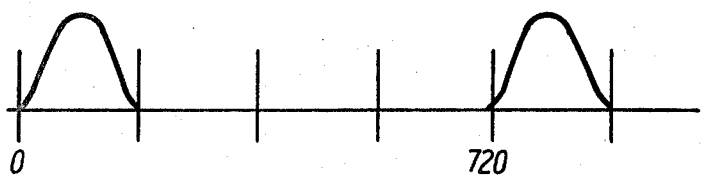
FIG. 3B is a diagram showing the characteristics of the rich mixture flow in the present invention.

If, according to the present invention, the opening part 4a of the spurt hole 4, i.e., the passage for the rich mixture, is near-completely closed, except in the suction stroke, by the intake valve 6 and as a result the gap becomes as narrow, say 0.05–0.80 mm, as if the passage were practically closed, the rich mixture will scarcely leak into the main passage 9 and, as shown in FIG. 3B, the leak of rich mixture will be near-completely prevented except in the suction stroke, thereby improving the distribution of the mixture among the cylinders.

The above embodiment refers to an example wherein the spurt hole 4 for the rich mixture from the auxiliary passage 2 is provided in the valve seat 5. However, it is possible, as illustrated in FIG. 5, to connect a flow pipe 4b to the auxiliary passage 2 in the cylinder head and set the downstream side of the pipe at the back 8 of the intake valve 6 such that the opening part 4c may be closed by one part of the intake valve 6 when the intake valve 6 is sitting on the valve seat 5. Thus, by arranging the opening part 4c of the auxiliary passage 2, such that through which the rich mixture is supplied, the opening part may be opened or closed by one part of the intake valve 6, the opening part 4c can be opened only in the suction stroke of the engine, thereby improving the distribution of the rich mixture supplied to the main combustion chamber 7.

In accordance with the present invention, poor distribution of the rich mixture due to pulsations in the intake manifold of a multicylinder engine can be corrected, and this improvement can be accomplished through a simple structure, because the spurt hole for the rich mixture is provided corresponding to the umbrella part of the intake valve and thus the supply holes of both the lean and the rich mixture can be controlled at the same time.

Moreover, on account of the spurt hole 4 being opened at the valve seat or in the vicinity thereof, the negative pressure can be effectively utilized and thereby the opening diameter of the spurt hole 4 can be made relatively small.

Obviously, numerous modifications and variations of the present invention are possible in light of these teachings. It is to be understood therefore, that within the scope of the appended claims the invention may be practiced otherwise than as specifically disclosed herein.

What is claimed as new and desired to be secured by Letters Patent of the United States is:

1. An internal combustion engine, wherein a rich air-fuel mixture is adapted to be ignited within an auxiliary combustion chamber and a lean air-fuel mixture is adapted to be ignited within a combustion chamber by means of said ignited rich air-fuel mixture, comprising:
   a cylinder;
   a cylinder head cooperating with said cylinder to define a combustion chamber;
   an intake valve having a valve stem and a valve head connected thereto;
   suction port means for introducing a lean air-fuel mixture into said combustion chamber;
   valve seat means adapted to seat said intake valve thereon; and
   passage means for introducing a rich air-fuel mixture into said combustion chamber prior to entry of said rich air-fuel mixture into an auxiliary combustion chamber;
   said passage means having an open end which opens in said suction port, said open end being adapted to be seated on said intake valve head whereby said open end is closed when said intake valve is seated on said valve seat.

2. An internal combustion engine as set forth in claim 1, wherein said passage comprises:
   a duct formed in said cylinder head.

3. An internal combustion engine as set forth in claim 2, wherein said passage further comprises:
   another duct formed in said valve seat, said another duct communicating with said duct at one end thereof and having an open end at the other end thereof.

4. An internal combustion engine as set forth in claim 3, wherein:
said open end is disposed at the inner surface of said valve seat, whereby said open end is closed by a peripheral portion of said valve head.

5. An internal combustion engine as set forth in claim 2, wherein said passage further comprises:
a pipe which communicates with said duct at one end thereof and has an open end at the other end thereof.

6. An internal combustion engine as set forth in claim 5, wherein:
said open end is adapted to be seated on the back face of said valve head.

7. An internal combustion engine as set forth in claim 1, further comprising:
an auxiliary combustion chamber which has an orifice through which said auxiliary combustion chamber communicates with said combustion chamber,
said orifice being disposed so that said rich mixture introduced into said combustion chamber is introduced into said auxiliary combustion chamber during a suction stroke and a compression stroke of said internal combustion engine; and
a spark plug disposed in said auxiliary combustion chamber for igniting said rich mixture introduced into said auxiliary combustion chamber to generate a flame jet to be spurted through said orifice to said combustion chamber, whereby said lean mixture introduced into said combustion chamber is burned by said flame jet.

8. An internal combustion engine as set forth in claim 7, wherein:
said orifice is disposed close to said open end of said passage.

9. An internal combustion engine as set forth in claim 1, wherein said passage comprises:
a duct formed in said cylinder head.

10. An internal combustion engine as set forth in claim 9, wherein said passage further comprises:
another duct formed in said valve seat, said another duct communicating with said duct at one end thereof and has said open end at the other end thereof.

11. An internal combustion engine as set forth in claim 10, wherein:
said open end is disposed in an inner surface of said valve seat, whereby said open end is closed by a peripheral portion of said valve head.

12. An internal combustion engine as set forth in claim 9, wherein said passage further comprises:
a pipe which communicates with said duct at one end thereof and has said open end at the other end thereof.

13. An internal combustion engine as set forth in claim 12, wherein:
said open end is adapted to be seated on the back face of said valve head.

14. An internal combustion engine as set forth in claim 1, further comprising:
an auxiliary combustion chamber which has first and second orifices through which said auxiliary combustion chamber communicates with said combustion chamber, said first orifice being disposed close to said open end whereby said rich mixture is introduced through said first orifice into said auxiliary combustion chamber; and
a spark plug disposed in said auxiliary combustion chamber for igniting said rich mixture introduced into said auxiliary combustion chamber to generate a flame jet to be spurted through said orifices to said combustion chamber, whereby said lean mixture introduced into said combustion chamber is burned by said flame jet.

* * * * *